United States Patent
Breitschwerdt et al.

[15] 3,671,994
[45] June 27, 1972

[54] INSTALLATION FOR CLEANING THE COVER PANES OF MOTOR VEHICLE HEADLIGHTS

[72] Inventors: Werner Breitschwerdt, Stuttgart-Botnang; Rudolf Andres, Sindelfingen; Gerhard Busch, Gechingen, all of Germany

[73] Assignee: Daimler-Benz Aktiengesellschaft, Stuttgart-Untertwerkheim, Germany

[22] Filed: Aug. 26, 1970

[21] Appl. No.: 67,140

[30] Foreign Application Priority Data

Aug. 29, 1969    Germany.....................G 69 34 013.2

[52] U.S. Cl............................15/250.36, 15/250.3, 116/28
[51] Int. Cl...........................................................B60s 1/38
[58] Field of Search .........15/250.02, 250.35, 250.3, 250.27, 15/250.36, 250.42; 116/28, 41; 240/8.4; 280/150 R; 296/84, 28 A

[56] References Cited

UNITED STATES PATENTS

| | | | |
|---|---|---|---|
| 2,143,997 | 1/1939 | Parkinson | 116/28 UX |
| 2,259,790 | 10/1941 | Auten | 15/250.3 |
| 2,672,841 | 3/1954 | Nitzberg | 240/8.4 X |
| 3,456,278 | 7/1969 | Mandy et al. | 15/250 A |

FOREIGN PATENTS OR APPLICATIONS 676,967  12/1963  Canada.............................15/250 A Primary Examiner—Peter Feldman
Attorney—Craig, Antonelli & Hill

[57] ABSTRACT

A cleaning installation for cleaning the cover panes of motor vehicle headlights by means of wipers adapted to move over the surfaces of the cover panes, in which the wipers, normally wiping a circular sector, are of such length that they can be visually observed from the vehicle interior space during a part of their movement when they project above the upper edge of a fender structure or the like into which the headlights are inserted.

14 Claims, 1 Drawing Figure

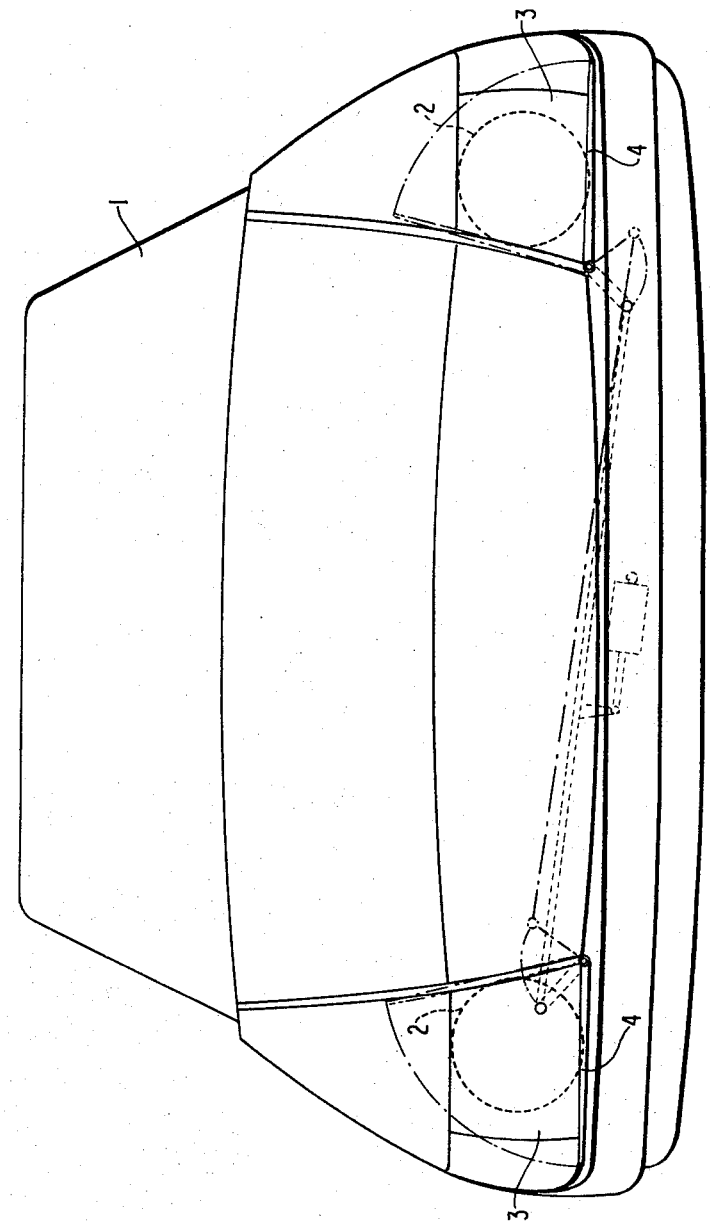

INSTALLATION FOR CLEANING THE COVER PANES OF MOTOR VEHICLE HEADLIGHTS

The present invention relates to an installation for the cleaning of cover panes of motor vehicle headlights by means of wiper arms adapted to be moved over the surface thereof.

The present invention is concerned with the task to so construct cleaning installations of this type that a control, and more particularly a visual control of the cleaning movements of the wipers is possible without special expenditures. The underlying problems are solved according to the present invention in an advantageous manner in that wipers are provided wiping a circular sector in a conventional manner and in that the wipers are constructed of such length that they are visible from the vehicle interior during a part of the wiper movement.

Accordingly, it is an object of the present invention to provide an installation for cleaning the cover panes of motor vehicle headlights which permits a visual supervision of the wiper movements from the motor vehicle interior space without special monitoring devices.

Another object of the present invention resides in an installation for cleaning the covers panes of motor vehicle headlights which is simple in construction, yet effective for its intended purposes.

A further object of the present invention resides in an installation for cleaning the covering panes of motor vehicle headlights which permits the driver to visually control the wiper movements from his seat in the vehicle without requiring any separate expenditures.

These and further objects, features, and advantages of the present invention will become more obvious from the following description when taken in connection with the accompanying drawing which shows, for purposes of illustration only, one embodiment in accordance with the present invention, and wherein:

The single FIGURE is a schematic front elevational view of a motor vehicle provided with an installation for cleaning the cover panes of the motor vehicle headlights in accordance with the present invention.

Referring now to the single FIGURE of the drawing, reference numeral 1 designates in this figure a schematically indicated motor vehicle of any conventional construction which includes headlights 2 arranged at the motor vehicle front end. The headlights 2 are covered off in a conventional manner by cover panes 3 of appropriate shape, for example, of such shape as to cover also a cluster of lights. A separate cleaning installation is provided for cleaning these cover panes 3 which essentially consists of wipers 4 coordinated to respective cover panes 3. The wipers 4 are conventionally driven from an electric motor by way of a linkage and levers in such a manner that they wipe a circular sector and thus clean the cover panes 3 possibly in conjunction with a washing installation of any conventional type.

In order to be able to control the movements of the wipers 4, the wipers 4 are constructed of such a length that during a portion of the wiper movement, they are visible from the inside of the motor vehicle in that they project above the forward upper edge of the fender into which are inserted and installed the headlights.

In the drawing, the lower horizontal end positions of the wipers 4 are shown in full lines while the upwardly projecting end positions thereof are indicated in dash and dot lines in which a substantial part of the wipers project above the upper edges 6 of the fenders or fender-like body parts into which are inserted the headlights 2. The wipers 4 may thereby be of any conventional, known construction, the only importance being that the length thereof as well as the mounting thereof is such that the visual control is possible as pointed out above.

While we have shown and described only one embodiment in accordance with the present invention, it is understood that the same is not limited thereto but is susceptible of numerous changes and modifications as known to those skilled in the art. For example, while the pivotal mounting of the wiper arms is indicated at the lower inward corner of the headlight panes 3, it is obvious that the pivot axis may also be located at any other place as long as the aforementioned requirements are fulfilled. Hence, we do not wish to be limited to the details shown and described herein, but intend to cover all such changes and modifications as are encompassed by the scope of the appended claims.

What I claim is:

1. An installation for cleaning the cover panes of motor vehicle headlights by wiper means adapted to move over the surfaces thereof, characterized in that wiper means are provided operable to wipe a substantially circular sector, and in that the wiper means are of such length that they are visible from the vehicle interior during a portion of the wiper movements thereof.

2. An installation according to claim 1, characterized in that the wiper means are pivotally mounted near the lower inner edge of a respective cover pane for a corresponding headlight.

3. An installation according to claim 2, characterized in that the wiper means wipe a sector substantially defined by an approximately horizontal and an approximately upright position of a respective wiper means.

4. An installation according to claim 3, characterized by common actuating means for simultaneously actuating the wiper means of both headlights in phase opposition.

5. An installation according to claim 4, characterized in that the wiper means have a normal rest position disposed substantially in a horizontal direction.

6. An installation according to claim 1, characterized in that the wiper means are actuated in substantially opposite directions so that they pivot substantially at all times in opposite directions.

7. An installation according to claim 1, characterized in that the wiper means wipe a sector substantially defined by an approximately horizontal and an approximately upright position of a respective wiper means.

8. An installation according to claim 7, characterized in that the wiper means have a normal rest position disposed substantially in a horizontal direction.

9. An installation according to claim 7, characterized in that the wiper means are actuated in substantially opposite directions so that they pivot substantially at all times in opposite directions.

10. An installation according to claim 1, characterized by common actuating means for simultaneously actuating the wiper means of both headlights in phase opposition.

11. An installation according to claim 2, characterized in that means are provided for positioning the wiper means out of the field of radiation of the headlights when the wiper means are in their normal rest position.

12. An installation according to claim 5, characterized in that the wiper means are positioned outside of the field of radiation of the headlights when in the normal rest position.

13. An installation according to claim 8, characterized in that the wiper means are positioned outside of the field of radiation of the headlights when in the normal rest position.

14. An installation according to claim 1, characterized in that the wiper means includes wiper blades for engaging the surface of the headlights during the headlight cleaning operation, said wiper blades being visible from the vehicle interior only during a portion of the wiper movements during the cleaning operation.

* * * * *